(12) United States Patent
Veeraraghavan et al.

(10) Patent No.: US 8,432,434 B2
(45) Date of Patent: Apr. 30, 2013

(54) CAMERA AND METHOD FOR FOCUS BASED DEPTH RECONSTRUCTION OF DYNAMIC SCENES

(75) Inventors: Ashok Veeraraghavan, Houston, TX (US); Nitesh Shroff, Greenbelt, MD (US); Yuichi Taguchi, Cambridge, MA (US); Cuneyt Oncel Tuzel, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 13/179,225

(22) Filed: Jul. 8, 2011

(65) Prior Publication Data

US 2013/0010067 A1 Jan. 10, 2013

(51) Int. Cl.
*H04N 13/02* (2006.01)
*G06T 15/00* (2006.01)
*G06K 9/00* (2006.01)

(52) U.S. Cl.
USPC ............ 348/46; 345/419; 382/106; 382/154

(58) Field of Classification Search .............. 348/46
See application file for complete search history.

(56) References Cited

U.S. PATENT DOCUMENTS

| 6,097,394 | A | * | 8/2000 | Levoy et al. | ............ | 345/419 |
| 2011/0262030 | A1 | * | 10/2011 | Sahay et al. | ............ | 382/154 |
| 2012/0148109 | A1 | * | 6/2012 | Kawamura et al. | ........ | 382/106 |

OTHER PUBLICATIONS

Szeliski, "Video Mosaic for Virtual Environment", IEEE Computer Graphics and Application, Mar. 1996, pp. 22-30.*
Rajagopalan et al.,"Optimal Recovery of Depth from Defocussed Images Using an MRF Model", ICCV 1998, pp. 1047-1052.*

* cited by examiner

*Primary Examiner* — Christopher S Kelley
*Assistant Examiner* — Hee-Yong Kim
(74) *Attorney, Agent, or Firm* — Dirk Brinkman; Gene Vinokur

(57) ABSTRACT

A dynamic scene is reconstructed as depths and an extended depth of field video by first acquiring, with a camera including a lens and sensor, a focal stack of the dynamic scene while changing a focal depth. An optical flow between the frames of the focal stack is determined, and the frames are warped according to the optical flow to align the frames and to generate a virtual static focal stack. Finally, a depth map and a texture map for each virtual static focal stack is generated using a depth from defocus, wherein the texture map corresponds to an EDOF image.

16 Claims, 2 Drawing Sheets

100

CAMERA AND METHOD FOR FOCUS BASED DEPTH RECONSTRUCTION OF DYNAMIC SCENES

FIELD OF THE INVENTION

This invention relates generally to video reconstruction, and more particularly to a camera and method for reconstructing depths and extended depth of field (EDOF) videos.

BACKGROUND OF THE INVENTION

Cameras are everywhere. There are billions of cell-phone cameras, over five hundred million surveillance cameras, cameras in cars, and at homes. In most cases, those cameras are passive devices that only record videos. This leaves most of the acquired videos unprocessed. A major bottleneck towards automating a visual scene interpretation is a lack of 3D information that is crucial for scene understanding. It is desired to adapt a conventional video camera to be able to provide meaningful 3D information during the acquisition of a video.

Variable Focus Makes Cameras 3D

Most modern cameras are equipped with features such as auto-focus, variable focal length and zoom, all of which require the focal distance to change. Unfortunately, this ability of the camera is significantly under-utilized. Typically, auto-focus is only used to obtain an image in which the subject of interest is in-focus.

Depth from Defocus (DFD)

Depth from defocus (DFD) analysis for depth estimation has significant advantages over stereo and structure analysis from motion, because DFD circumvents the correspondence problem required for stereo analysis. Another advantage of DFD over stereo is that only a single camera is required in DFD.

Several methods for solving DFD are known. Typically, those methods minimize a cost function including a data term and a spatial regularization term. The data term constrains how the texture blurs as a function of known focal distances corresponding to depths. The regularization term models spatial smoothness constraints within the depth map of the scene. However, all existing methods assume that the camera and scene are static. None of those methods can use DFD for dynamic scenes. As used defined, dynamic scene have either scene motion and/or camera motion.

Variable Depth of Field Imaging

The depth-of-field (DOF) of an imaging system can be extended by reducing the aperture. However, this reduces the amount of light received by the camera sensor, leading to a low signal to noise ratio (SNR). If the aperture is increased, then the sensor noise is reduced but at the cost of a decrease in the DOF.

Ideally, a large DOF is desired but with reduced sensor noise. Several methods are known that overcome this fundamental trade-off between the sensor noise and the DOF. For example, a broadband mask at the aperture makes the point spread function of blur better behaved. This enables computational deblurring and extending the DOF.

The DOF can also be increased by inserting a cubic phase plate near the lens, or by moving the sensor during the exposure time. In both those methods, the acquired image is blurred, but the blur kernel is independent of depth, and therefore, can be deblurred using deblurring methods.

Basics and Limitations of DFD

A camera acquires light from a scene and projects the light on a sensor. Parts of the scene that are in focus are at depth ($s_0$) given by the thin lens law $$\frac{1}{F_l} = \frac{1}{v} + \frac{1}{s_0}, \qquad (1)$$

where $F_l$ is the focal length of the lens, and $v$ is the distance between the lens and the sensor. Scene points that are at distance $s \neq s_0$ have a circle of confusion (blur) in the image plane. The distribution of light within this blur circle is referred to as the Point Spread Function (PSF). The PSF is a disc with a radius $\sigma$ depending on the depth s of scene point:

$$\sigma = \frac{Dv}{2}\left(\frac{1}{F_l} - \frac{1}{v} - \frac{1}{s}\right), \qquad (2)$$

where D is the lens aperture.

Typical DFD methods acquire a focal stack $F= \{F_1, F_2, \ldots, F_M\}$ of a sequence of M frames $F_j$ (video) acquired at various focus settings. That is, images in a focal stack as known in the art are inherently acquired at different focus depths or focal planes.

The basic assumption in a conventional DFD method is that the scene and camera are static. The dynamic scenes lead to correspondence errors in the DFD, resulting in depth and texture errors. In extended DOF (EDOF) images, the error appears as multiple copies of the moving object, while in the depth map, spurious depth edges are present on and around parts of the scene with motion.

It is desired to correct these prior art problems.

SUMMARY OF THE INVENTION

A conventional depth from defocus (DFD) method assumes that a camera and a scene are static while acquiring a video. The embodiments of the invention describe how to apply DFD to dynamic scenes and generate depth maps and extended DOF videos.

Given an accurate optical flow (OF), we can warp a focal stack (F) of frames to obtain a virtual static focal stack, and apply DFD methods to the virtual static focal stack.

Acquiring an accurate OF, in the presence of varying focal blur, is a challenging task. Focal blur variations cause inherent biases in the estimation of optical flow.

We accurately handle these biases and determine the OF in the presence of varying focal blur. This leads to a system and method that converts a conventional 30 fps video camera into a co-located 30 fps imaging device and range sensor.

Furthermore, the ability to extract range and image information allows us to render images with artistic depth-of field effects, such as extending or reducing the depth of field of the acquired images and performing post-acquisition digital refocusing.

DETAILED DESCRIPTION OF THE PREFERRED EMBODIMENT

The embodiments of the invention provide a method for reconstructing a depth and extended depth of field video (EDOF) from a sequence of frames acquired by a video camera. The terms frame and image are used interchangeably herein.

DFD in Dynamic Scenes

We adapt conventional depth form defocus (DFD) methods to handle dynamic scenes, i.e., scenes with either camera or scene motion or both. Let us assume that we have the motion information between frame $F_i$ and all the other frames within a focal stack F. Intuitively, this information can be used to warp frame $\{F_j\}$, for j=1 to M, to $F_i$.

This generates a virtual static focal stack $Z_i$ corresponding to the time instant i. Because the motion has been compensated for in the virtual static focal stack, the scene points are all in correspondence. Depth and texture maps for time instant i can then be obtained from our virtual static focal stack.

It is worth to note that no spatial or temporal information has been traded off to obtain these maps. The central problem in motion estimation is the presence of varying defocus blur across the frames.

Conventional motion estimation methods for determining optical flow (OF) between two images rely on the assumption of brightness constancy.

$$I(x,y,t)=I(x+\delta x,y+\delta y,t+\delta t), \quad (3)$$

where (x, y) are the pixel locations, t is a time instant, ($\delta x$, $\delta y$) are the displacements of the corresponding pixels (i.e., optical flow), and $\delta t$ is the time difference between the images.

We analyze the effect of varying defocus blur on estimating the OF. When two images are focused at different depths, points in the scene at the same location have different intensities. This is because a varying focal setting blurs with different kernels, leading to the violation of the above brightness constancy. This violation induces spurious optical flow if conventional OF methods are applied directly on the acquired video data.

In the absence of any further information, determining the OF with changing blur levels is a challenging task. However, given the depth map and the texture map of the scene at time instant i, the optical flow can be solved accurately using reblurring. With the given the texture and the depth map, it is possible to simulate images with any focal setting. Thus, we can generate two images, at adjacent time instants, with identical focal settings. The amount of blur for any scene point is the same for both images because the focal setting is identical. Thus brightness constancy is conserved leading to accurate optical flow estimates. Likewise, given the flow information the depth and the texture map can be recovered using the DFD. This leads to an iterative refinement method for estimating the depth and the texture of a dynamic scene via stage-wise optimization.

Iterative Reconstruction of Depth and Flow

Figure 1:
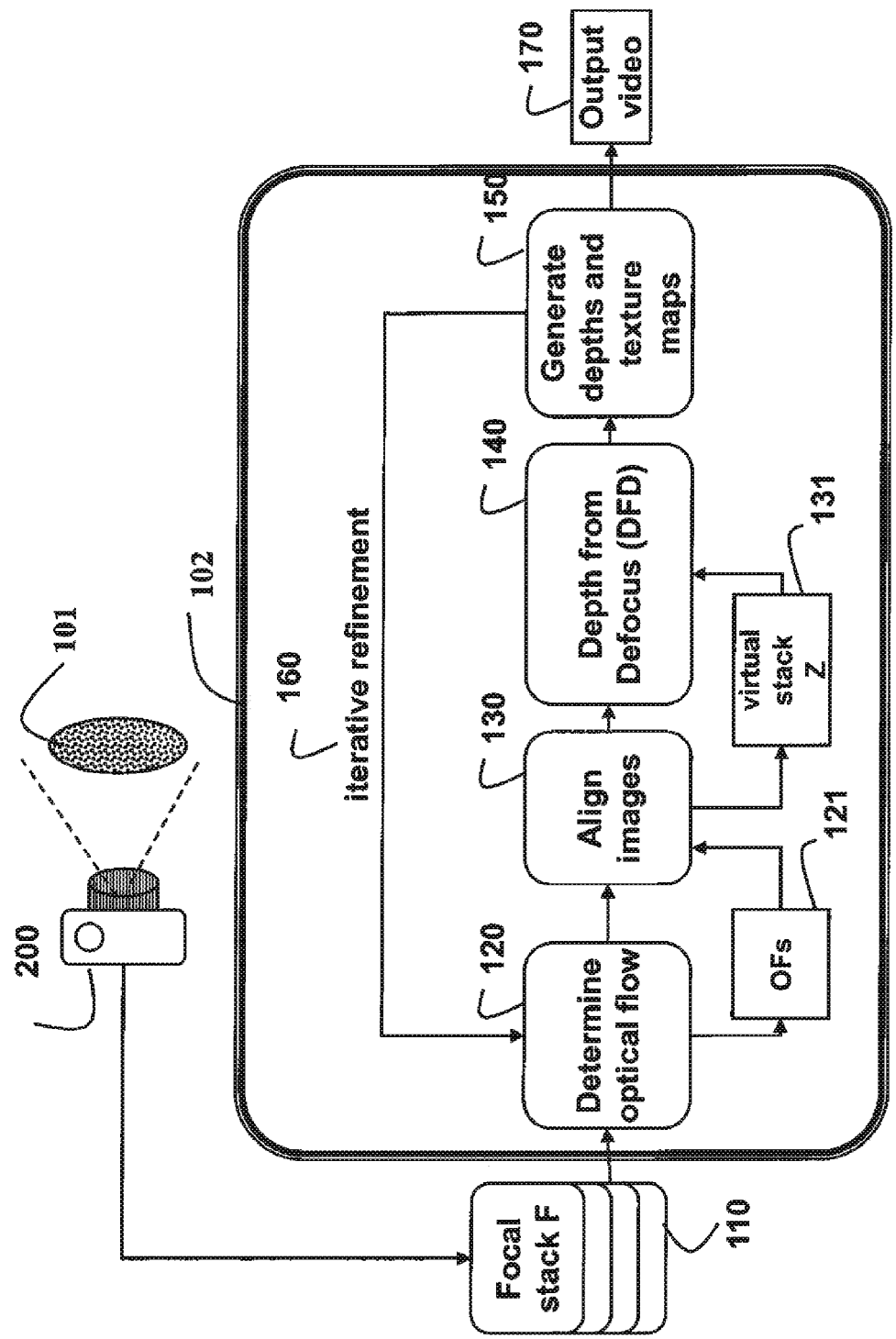
FIG. 1 is a flow diagram of a method for reconstructing a depth and extended depth of field video according to embodiments of the invention.

FIG. 1 shows a method 100 for reconstructing a depth and EDOF video according to embodiments of our invention.

We acquire a sequence of frames as a focal stack (F) 110 of a dynamic scene 101 using a camera 200. That is, the frames are inherently acquired at different focal depths. Given F, we initially determine 120 the optical flows (OFs) 121 between all pairs of consecutive frames in the focal stack. Then, we warp the frames to align 130 the frames according to the OF to generate a virtual static focal stack (Z) 131 for each time instant.

A DFD method 140 is applied to the virtual static focal stack to generate 150 the depth map and texture map 150 for each time instant. In the preferred embodiment, the DFD method uses a spatio-temporal Markov random field (MRF) minimized by an energy function, as described below. Other DFD methods are also applicable.

The depth and texture maps are refined by iterations 160. Finally, the depth and texture maps for each time instant are obtained as the output 170. The texture maps correspond to the extended depth of field (EDOF) video, because the maps have larger DOFs than the original input images. The above steps can be performed in a processor 102 connected to a memory and input/output interfaces as known in the art. The processor can be internal or external to the camera.

Initial Optical Flow

During the initial optical flow determination, the depth and the texture maps are not available. To recover the initial OF, we make the following assumption. The flow has a constant velocity within a time period M of the focal stack. Frames from two consecutive focal stacks, e.g., frames i and M+i of the video, have the same blur levels, and hence satisfy the brightness constancy.

We determine the OF between $i^{th}$ and $(M+i)^{th}$ frames, and linearly interpolate the flow for the in-between frames. Although the initial optical flow is coarse due to the constant velocity assumption, the OF is refined via reblurring during the following iterations.

Flow Given Depth and Texture

After the initial iteration of the DFD, the method generates a coarse estimation of the depth maps and the texture maps of the scene. Let $D_i$ and $T_i$ be the depth map and the texture map of the scene at time instant i, respectively. The depth map $D_i$ enables us to blur the texture map $T_i$ with kernels, wherein the kernels are dependent on the depth maps. After the blur level of the frames are matched, the brightness constancy is satisfied, and hence, the OF can be determined with greater accuracy.

Occlusion

Here, we describe the occlusion problem in motion compensation. Consider two consecutive frames $F_i$ and $F_j$ the focal stack F. Motion can cause occlusions of a region of background pixels by foreground pixels. In $F_i$, a background region may be blurred, while the background may be occluded in the later frame $F_j$ of the focal stack. This implies that the information regarding the focused background for this occluded region is unavailable.

While warping frame $F_j$ to $F_i$ to compensate for the motion, the occlusion region need to be detected and filled in. The occlusion region is detected by the inconsistency between the forward and backward OFs.

Pixels in a region are assumed to be occluded when the forward-backward OF tracking results in disparities. The occluded region can be filled by copying pixels from other frames of the video, where the region is not occluded. If the occluded regions are static, then we fill the occlusions by using frames without blur from different focal stacks; otherwise, we fill the regions using original blurred frames in the current focal stack. In the latter case, blur artifacts remain in the occluded regions.

Depth and Texture Given Optical Flow

After aligning the frames in the focal stack using the OF, we estimate depth maps $D=\{D_1, D_2, \ldots, D_M\}$, and texture maps $T=\{T_1, T_2, \ldots, T_M\}$ corresponding to each frame $F_i$ in the focal stack. We formulate the problem of depth estimation using a spatio-temporal Markov random field (MRF).

We define the MRF using superpixels of the frames as nodes. A Markov random field is a graphical model in which a set of random variables have a Markov property described by an undirected graph. We assume that each superpixel is represented by a front-parallel plane having a single depth value. Superpixel segmentation for each frame is obtained using an iterative method.

We initialize superpixels as a regular grid and update their shapes based on the current Gaussian estimate of shape and color distribution of each segment.

This produces superpixels which are regularly shaped. Given the set of superpixels P and a finite set of depth labels S, the objective is to assign a depth label s to each superpixel p.

The energy function E(s) of the MRF is $$E(s) = \sum_{p \in P} D_p(s_p) + \alpha \sum_{\{p,q\}} V_{pq}(s_p, s_q), \quad (4)$$

where a data term $D_p(s)_p$ is for superpixel p with depth level $s_p$, a smoothness term $V_{pq}(s_p, s_q)$ is for neighboring superpixels p and q, and $\alpha$ controls a degree of regularization.

To determine the data term $D_p(s_p)$, we assume that a texture map $T_i$ is available for each focal stack frame $F_i$. Initially, these texture maps are obtained by applying a photomontage method on the virtual static focal stack $Z_i$. The photomontage method determines a sharpness measure for a local region and selects pixels from the frame where the region is sharp After the first iteration, we use the texture maps determined using the previous estimate of the generated depth maps.

Given the textures, the data term is determined by the sum of the squared difference between the observed superpixel and the reblurred superpixel for each depth level $s_p$. The PSF is assumed to be a disk kernel for reblurring the textures.

In our MRF formulation, we consider both spatial and temporal smoothness. The smoothness term is $$V_{pq}(s_p, s_q) = w_{pq}|s_p - s_q|, \quad (5)$$

where $|s_p - s_q|$ penalizes depth discontinuities between the neighboring superpixels p and q, and $w_{pq}$ is a spatio-temporal weighting factor.

The weight $w_{pq}$ between two spatially neighboring superpixels p and q is determined by the similarity in the average colors of the two superpixels $$w_{pq} = \exp(-(\|I_p - I_q\|)/\tau),$$

where $I_p$ and $I_q$ are the average colors of the superpixels p and q, and $\tau$ is a control parameter for the similarity of the colors.

Weights for the temporally neighboring superpixels are determined as follows. Consider frames A and B. Let u be the OF between these two frames. Superpixel p in frame A is warped to frame B using the OF u. The overlap of superpixel p with the superpixels of frame B is then used as weights between temporal neighbors.

We use a graph cut method to minimize the energy function. In graph theory, a cut is a partition of the vertices of a graph into two disjoint subsets. The cut-set of the cut is the set of edges whose end points are in different subsets of the partition. Edges are said to be crossing the cut if they are in its cut-set.

Camera

Figure 2:
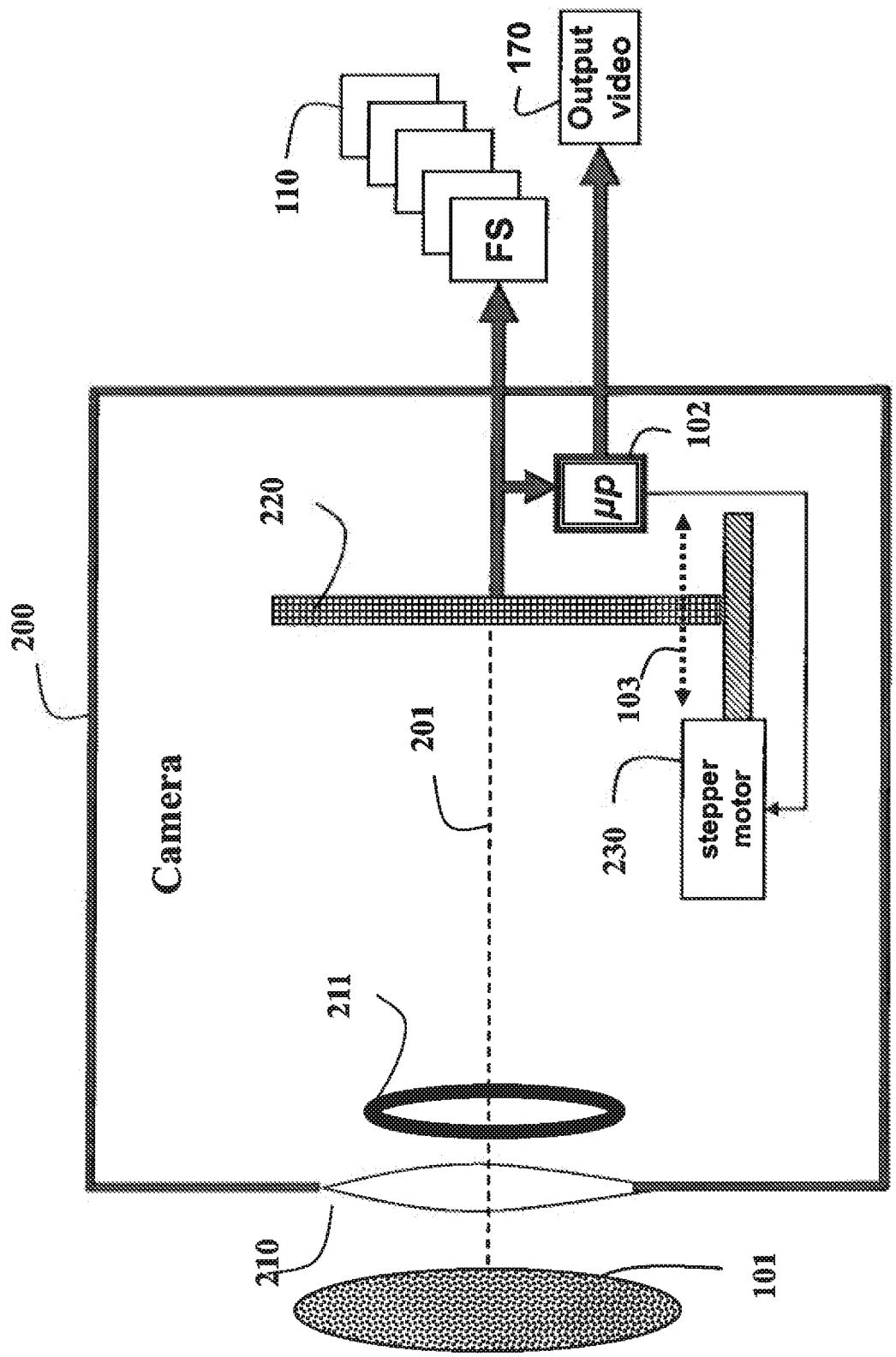
FIG. 2 is a schematic of a video camera according to embodiments of the invention.

FIG. 2 schematically shows the camera 200 according to one embodiment of our invention. The camera includes a lens 210 and aperture 211, a progressive scan CCD sensor 220, and a stepper motor 230. The stepping motor can be controlled by a microprocessor (µp) 102. Most modern digital include one or more microprocessors, which can be programmed. The camera is calibrated. The C-mount lens, which has a focal length of 12.5 mm, is fixed with respect to the camera.

While the description is limited to achieving focus control for the focal stack by moving the sensor, it is understood that the invention applies equally well to other means of changing the focus depth, including moving the lens, using a liquid lens, using a Varioptic® lens, moving some parts of a lens assembly, moving one lens element in a multi-element lens, etc.

The stepper motor can drive the sensor 2 µpm in each step. Thus, the distance between two consecutive sensor positions to acquire a frame can be varied at multiples of 2 µm. This can be controlled according to the DOF in the scene 101 to be acquired, and the number of frames required per focal stack 110. In one embodiment, we use 67 steps (134 µm) 103 between two consecutive sensor positions. While acquiring the video, we move the sensor continuously and typically keep our exposure time to be 10 msec. A very small translation of the camera sensor covers a large amount of focal depths.

The sensor translates along the optical axis 201 of the lens with a constant speed. When the sensor reaches the pre-specified extremum (maxima or minima) in one direction, the sensor translates in the opposite direction. Hence, the camera is capable of continuously acquiring frames at 30 frames per second.

In one embodiment, during one half period of sensor motion, the camera acquires five frames, which is the size of the focal stack 110.

In another embodiment, the method 100 is implemented in the microprocessor 102 so that the output of the camera is the EDOF video 170. That is, the microprocessor implements the means for determining the optical flow, aligning the images, the DFD method, and generating the depth and texture maps.

Depth of Field Control

Because the camera and method allow us to obtain both depth and texture simultaneously for dynamic scenes, this enables us to synthetically manipulate the depth of field (DOF) of the acquired images. For example, we can generate artistic images having a very shallow DOF by reducing the DOF. We can also perform post-acquisition digital refocusing, which can be done automatically or interactively with user input. The depth quantization of the DFD method is much finer than the DOF of each of the acquired focal stack.

EFFECT OF THE INVENTION

Conventional DFD methods assume that the camera and the scene are static while the frames are acquired. We describe the effect of camera and scene motion on those DFD methods, and describe how optical flow analysis and motion estimation can be exploited towards extending the problem of DFD and EDOF imaging to dynamic scenes. Given an accurate OF, we can accurately warp the frames in the focal stack to obtain a virtual static focal stack and apply DFD methods on the virtual static focal stack. Our idea of performing explicit motion compensation is general: Although our DFD implementation is based on a graph cut formulation, the embodiments described herein can be trivially extended for other DFD approaches.

Acquiring an accurate OF, in the presence of varying focal blur is a challenging task. We describe how focal blur variations cause inherent biases in the estimation of the OF, and how to handle these biases and determine an accurate OF in the presence of varying focal blur. As a direct consequence of our ability to align multiple frames accurately, we are able to extract depth information and texture map at the inherent frame-rate of the camera, thereby converting a conventional 30 fps camera into a 30 fps extended depth-of-field (EDOF) camera and a 30 fps range sensor simultaneously.

Further, the ability to extract range and image information allows us to render images with artistic depth-of field effects, such as extending or reducing the depth of field of the acquired images, and performing post-acquisition digital refocusing.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for reconstructing a dynamic scene as depths and an extended depth of field (EDOF) video, comprising the steps of:
    acquiring, with a video camera, a focal stack of the dynamic scene, wherein the focal stack includes a sequence of frames at consecutive time instants;
    determining an optical flow between the frames of the focal stack;
    warping the frames according to the optical flow to align the frames and to generate a virtual static focal stack for each time instance; and
    generating a depth map and a texture map for each virtual static focal stack using a depth from defocus (DFD) method, wherein the texture map corresponds to an EDOF image, wherein the DFD uses a spatio-temporal Markov random field (MRF) minimized by an energy function E(s)

$$E(s) = \sum_{p \in \mathbb{P}} D_p(s_p) + \alpha \sum_{\{p,q\}} V_{pq}(s_p, s_q),$$

wherein a data term $D_p(s_p)$ is for superpixel p with depth level $s_p$, a smoothness term $V_{pq}(s_p, s_q)$ is for neighboring superpixels p and q, and $\alpha$ controls a degree of regularization, the smoothness term is $V_{pq}(s_p, s_q) = w_{pq}|s_p - s_q|$, $|s_p - s_q|$ penalizes depth discontinuities between the neighboring superpixels p and q, and $w_{pq}$ is a spatio-temporal weighting factor, the weight $w_{pq}$ between two spatially neighboring superpixels p and q is determined by a similarity in an average colors of the two superpixels $w_{pq} = \exp(-(\|I_p - I_q\|)/\tau)$, where $I_p$ and $I_q$ are the average colors of the superpixels p and q, and $\tau$ is a control parameter for the similarity of the average colors.

2. The method of claim 1, further comprising:
    repeating the determining, warping, and generating steps to refine the depth maps and the texture maps.

3. The method of claim 1, wherein the time instants are determined by an inherent frame rate of the camera.

4. The method of clan where the optical flow is determined between pairs of consecutive frames.

5. The method of claim 1, further comprising:
    blurring each texture map with kernels, wherein the kernels are dependent on the corresponding depth map.

6. The method of claim 1, further comprising:
    detecting occluded pixels in the frames; and
    filling the occluded pixels with corresponding pixels from other frames that are not occluded.

7. The method of claim 1, wherein the MRF is defined by nodes corresponding to segments of superpixels of the frames based on a current Gaussian estimate of shape and color distribution of each segment.

8. The method of claim 1, wherein initial texture maps are obtained by applying a photomontage method on the virtual static focal stack.

9. The method of claim 1, wherein the texture maps determined using previously generated depth maps.

10. The method of claim 1, wherein the energy function is minimized using a graph cut method.

11. The method of claim 1, wherein a translation is at a constant speed, and the sensor of the camera reaches a pre-specified extremum in one direction, the sensor translates in an opposite direction.

12. The method of claim 1, wherein the focal stack is obtained by moving a sensor element with respect to a static lens element.

13. The method in claim 1, wherein the focal stack is obtained by moving either the entire lens or a part thereof of a multiple-lens assembly.

14. The method in claim 1, wherein the focal stack is obtained by controlling focus of a liquid lens.

15. The method of claim 1, wherein the determining, warping, and generating steps are performed by a microprocessor.

16. An apparatus for reconstructing a dynamic scene as depths and an extended depth of field (EDOF) video, comprising:
    a camera including a lens and sensor;
    a sensor configured to acquire a focal stack including a sequence of frames at consecutive time instants;
    means for determining an optical flow between the frames of the focal stack;
    means for warping the frames according to the optical flow to align the frames and generate a virtual static focal stack for each time instance; and
    means for generating a depth map and a texture map for each virtual static focal stack using a depth from defocus (DFD) method, wherein the texture map corresponds to an EDOF image, wherein the DFD uses a spatio-temporal Markov random field (MRF) minimized by an energy function E(s)

$$E(s) = \sum_{p \in \mathbb{P}} D_p(s_p) + \alpha \sum_{\{p,q\}} V_{pq}(s_p, s_q),$$

wherein a data term $D_p(s_p)$ is for superpixel p with depth level $s_p$, smoothness term $V_{pq}(s_p, s_q)$ is for neighboring superpixels p and q, and $\alpha$ controls a degree of regularization, the smoothness term is $V_{pq}(s_p, s_q) = w_{pq}|s_p - s_q|$, $|s_p - s_q|$ penalizes depth discontinuities between the neighboring superpixels p and q, and $w_{pq}$ is a spatio-temporal weighting factor, the weight $w_{pq}$ between two spatially neighboring superpixels p and q is determined by a similarity in an average colors of the two superpixels $w_{pq} = \exp(-\|I_p - I_q\|/\tau)$, where $I_p$ and $I_q$ are the average colors of the superpixels p and q, and $\tau$ is a control parameter for the similarity of the average colors.

* * * * *